United States Patent [19]
Floresta et al.

[11] Patent Number: 5,646,467
[45] Date of Patent: Jul. 8, 1997

[54] AXIAL AIRGAP DC MOTOR

[75] Inventors: John G. Floresta, Commack; Darius T. Bobelis, Lindenhurst, both of N.Y.

[73] Assignee: Kollmorgen Corporation, Waltham, Mass.

[21] Appl. No.: 590,958

[22] Filed: Jan. 24, 1996

Related U.S. Application Data

[63] Continuation of Ser. No. 228,618, Apr. 15, 1994, abandoned.

[51] Int. Cl.$^6$ .............................. H02K 1/22; H02K 21/26; H02K 23/04
[52] U.S. Cl. ................................. 310/268; 310/154
[58] Field of Search ............................. 310/42, 43, 89, 310/91, 154, 237, 248, 254, 258, 268, DIG. 6

[56] References Cited

U.S. PATENT DOCUMENTS

| | | | |
|---|---|---|---|
| 3,171,051 | 2/1965 | Burr | 310/268 |
| 3,488,539 | 1/1970 | Tucker . | |
| 3,575,624 | 4/1971 | Keogh . | |
| 3,737,697 | 6/1973 | Kitamori et al. . | |
| 3,979,619 | 9/1976 | Whiteley | 310/268 |
| 4,188,556 | 2/1980 | Hahn | 310/268 |
| 4,321,499 | 3/1982 | Gupta . | |
| 4,341,973 | 7/1982 | Maruko et al. . | |
| 4,360,751 | 11/1982 | Arnold, Jr. et al. . | |
| 4,413,895 | 11/1983 | Lee . | |
| 4,536,672 | 8/1985 | Kanayama et al. . | |
| 4,605,873 | 8/1986 | Hahn | 310/154 |
| 4,794,293 | 12/1988 | Fujisaki et al. . | |
| 5,079,461 | 1/1992 | Schlüter et al. . | |
| 5,099,162 | 3/1992 | Sawada . | |
| 5,124,604 | 6/1992 | Swartz . | |
| 5,144,183 | 9/1992 | Farrenkopf . | |
| 5,334,898 | 8/1994 | Skybyk | 310/268 |

*Primary Examiner*—Clayton E. Laballe
*Attorney, Agent, or Firm*—Morgan & Finnegan

[57] ABSTRACT

An axial air gap motor comprising a housing having a first endplate and an opposed second endplate, a stator assembly mounted within the housing, and a rotor assembly rotatable mounted within the housing. The rotor assembly includes an annular disc shaped armature, wherein the armature includes a front facing surface and a rear facing surface. Additionally, the stator assembly includes a first magnetic permeable flux return plate secured to the first endplate and a magnet assembly secured to the first flux return plate. The magnet assembly is positioned between the first flux return plate and the front facing surface of said armature for directing a magnetic field to said armature in a direction normal to a plane of said armature. The stator further including a magnetic permeable second flux return plate secured to the second endplate.

21 Claims, 4 Drawing Sheets

FIG. I (PRIOR ART)

AXIAL AIRGAP DC MOTOR

This is a continuation of application Ser. No. 08/228,618, filed on Apr. 15, 1994 now abandoned.

FIELD OF THE INVENTION

The present invention relates to electric motors. More particularly, the present invention relates to axial air gap DC motors.

BACKGROUND OF THE INVENTION

Axial air gap motors have been employed for many years. During that time they have taken many configurations. The motors use magnets in combination with rotating, flat profile windings made either from stampings, etchings or conventionally wound wire that have been employed for some time in DC and AC motors.

Axial air gap motors are often referred to as flat or "pancake" motors, and have been employed in numerous applications where length is an important design consideration. In general, axial air gap armature designs provide the shortest length motor profiles currently available. The motors are characterized by axial air gap, printed, stamped or wire wound armatures. The motors are also characterized by axially or radially oriented brush/spring assemblies for axial or radial commutation.

While axial air gap motors have proven themselves beneficial for their desired purposes, today there are many applications where reduction of length must be optimized even further. For example, this is the case with motors used in many automotive applications, such as in radiator and condenser cooling modules, as well as window lifts, blower assemblies and the like. Engine compartments and body panels in automobiles are constantly decreasing in available volume, while passenger space is constant or increasing. Consequently, minimizing length and weight, as well as costs, while maximizing power output are important criteria for not only automotive applications but also other applications of "pancake" motors, as, for example, aerospace, industrial and other commercial applications.

A typical prior art air gap motor is shown in FIG. 1. Permanent magnets 10 are fixedly secured to endplates 12 of the stator. The endplates are made of magnetic, permeable materials (for example, steel or iron) and act as a flux return path. The housing 14 is completed by an aluminum cylindrical outer ring 16 positioned between the endplates 12. An armature 18 mounted on a rotary shaft 20 is provided in the space between the magnets 10. Current is applied to the armature 14 through brushes 22. The armature 18 is a conventional profile winding made either from stampings, etchings or conventional wound wire.

Currently, axial air gap motors, such as the one disclosed in FIG. 1, are constructed with a stator assembly consisting of a set of permanent magnets 10 on one or both sides of the armature 18. The magnets 10, are typically bonded to endplates 12 of magnetic, permeable material, for example, cold rolled steel or iron. The magnets are most commonly made of Alnico material, although in recent years motors with high coercivity magnets containing rare earth elements (samarium cobalt, neodymium, or praesydmium) have become available. The prior art motor further includes a wave washer 24 and a charge coil winding 26.

The armatures of axial air gap motors are usually stampings, etchings or conventional wire windings. The following U.S. patents are exemplary of armature designs currently utilized:

U.S. Pat. No. 3,488,539 ("Tucker")
U.S. Pat. No. 3,575,624 ("Keogh")
U.S. Pat. No. 3,737,697 ("Kitamori et al.")
U.S. Pat. No. 4,321,499 ("Gupta")
U.S. Pat. No. 4,341,973 ("Maruko et al.")
U.S. Pat. No. 4,413,895 ("Lee")
U.S. Pat. No. 4,794,293 ("Fukisaki et al.")
U.S. Pat. No. 5,099,162 ("Sawada")
U.S. Pat. No. 5,144,183 ("Farrenkopf").

As stated previously, prior axial air gap motors use the motor endplates as a flux return path. As a result, the endplates must be made from expensive materials, such as steel or iron, which must be plated to prevent oxidation. Although lighter weight and less costly material, such as aluminum, would facilitate significant savings, aluminum endplates cannot be used in present motors since aluminum does not have the necessary permeability to be used as a flux return path.

Additionally, stators (that is, magnets, endplates and brushes) of prior art motors require a long assembly time since they are made from a "series" build. That is, each step of the assembly process is contingent upon, and cannot be started before, the prior assembly is completed. As a result, magnets cannot be bonded to the endplates until the endplates are made, brushes and bearings cannot be inserted until the magnets are bonded, etc. This lengthens the manufacturing cycle, tends to increase inventory, and seriously impedes a manufacturer's ability to increase responsiveness to customers.

The use of Alnico magnets in prior art motors requires that the magnet charging be done in situ. As such, an internal charge wire must be built into, and remain, in the motor. However, the recent use of high coercivity magnets containing rare earth elements in axial air gap motors has eliminated this problem. Despite these advances, designs for axial air gap motors have not fully utilized the cost benefits these high coercivity magnets facilitate.

Additionally, modifying motor performance characteristics (that is, increasing torque and/or power) in existing axial air gap motors is typically difficult and requires significant redesign. Specifically, torque can only be increased by either increasing the material grade, decreasing the air gap, or increasing the magnet dimensions (typically length). In doing so, significant design costs are incurred, a propagation of new parts occur that must be introduced, maintained, and warehoused, the difficulty of maintaining the motor increases and inventory costs increase. In addition, motor length must typically increase to accommodate the longer magnets required by higher torque motors. The increase in motor length tends to nullify the advantages associated with the flat profiles provided by axial air gap motors.

Finally, current axial air gap motors are difficult to manufacture, require significant assembly, tooling and jigs, require significant assembler training, and have long manufacturing cycle times and high inventory costs.

Despite the advances made by presently available axial air gap motors, it is apparent that the need for a convenient, inexpensive and reliable motor still remains. The present invention fulfills this need.

SUMMARY OF THE INVENTION

Therefore, it is an object of the present invention to provide a motor having a reduced manufacturing cycle time.

Another object of the present invention is to provide a motor that significantly reduces inventory costs by allowing multiple versions of a specific housing size to be made from common parts.

A further object of the present invention is to provide a motor permitting multiple torque performances within a single housing size by simply using shims or spacers within the motor.

Another object of the present invention is to provide a motor permitting parallel manufacture to occur where subassemblies are not contingent on previous subassemblies, and can be made concurrently with other subassemblies.

A further object of the present invention is to provide a motor that provides significant advantages in cost, flexibility, and performance.

Another object of the present invention is to provide a motor having reduced material and labor costs.

It is also an object of the present invention to provide a motor that significantly reduces repair and field replacement costs, significantly reduces the skill and know-how needed by assemblers, requires very simple tooling and fixturization, facilitates field replacement of components (particularly brushes), and is lighter in weight than existing axial air gap DC motors.

These and other objects of the present invention are accomplished by an axial air gap motor comprising a housing having a first endplate and an opposed second endplate, a stator assembly mounted within the housing, and a rotor assembly rotatable mounted within the housing. The rotor assembly includes an annular disc shaped armature, wherein the armature includes a front facing surface and a rear facing surface. Additionally, the stator assembly includes a magnetic, permeable first flux return plate secured to the first endplate and a magnet assembly secured to the first flux return plate. The magnet assembly is positioned between the first flux return plate and the front facing surface of the armature for directing a magnetic field to the armature in a direction normal to a plane of the armature. The stator further including a magnetic, permeable second flux return plate secured to the second endplate.

Other objects, advantages and salient features of the invention will become apparent from the following detailed description, which taken in conjunction with the annexed drawings, discloses the preferred embodiments of the present invention.

DETAILED DESCRIPTION OF THE PREFERRED EMBODIMENT

Figure 1:
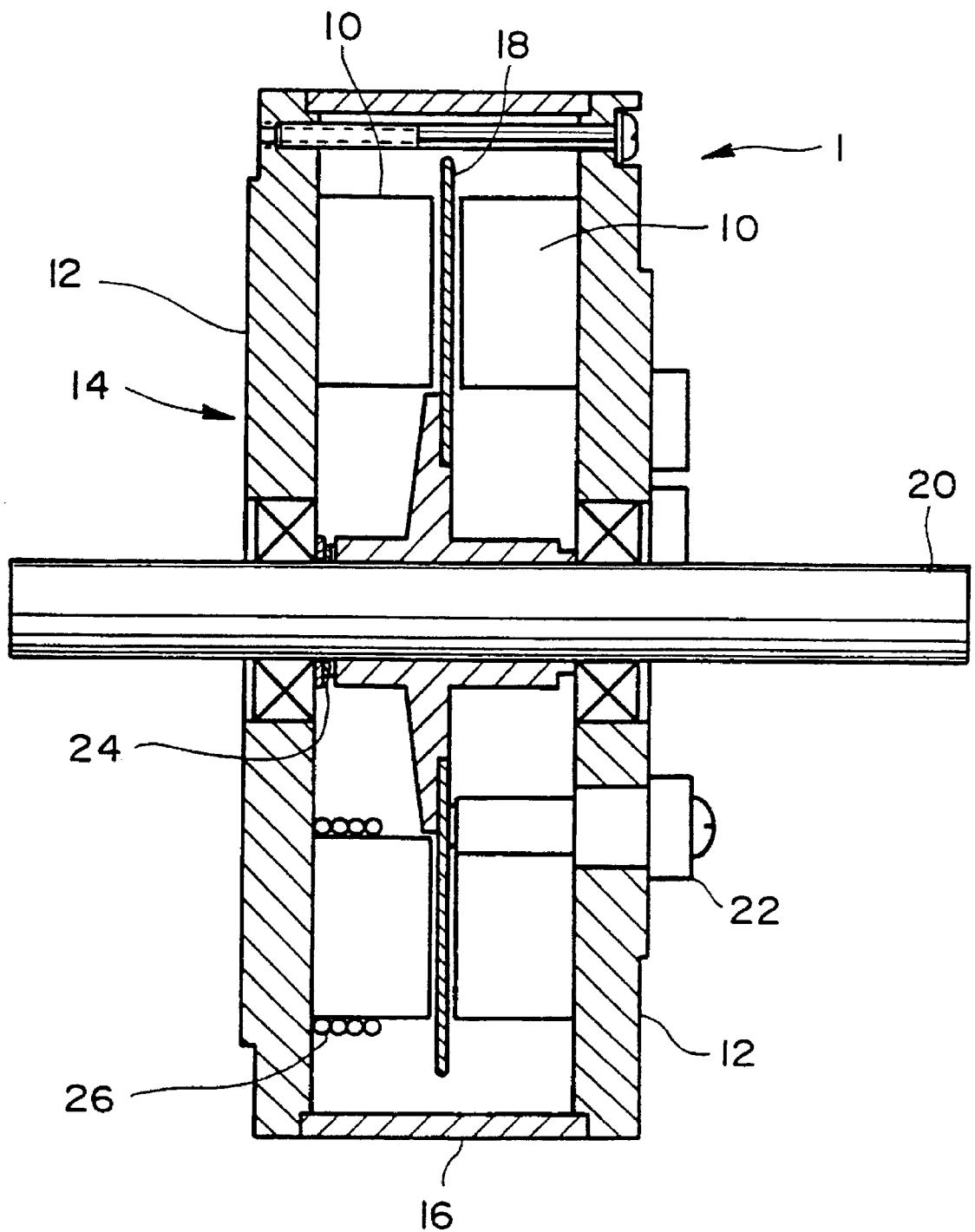
FIG. 1 is a cross sectional view of a prior art axial air gap motor.
Figure 2:
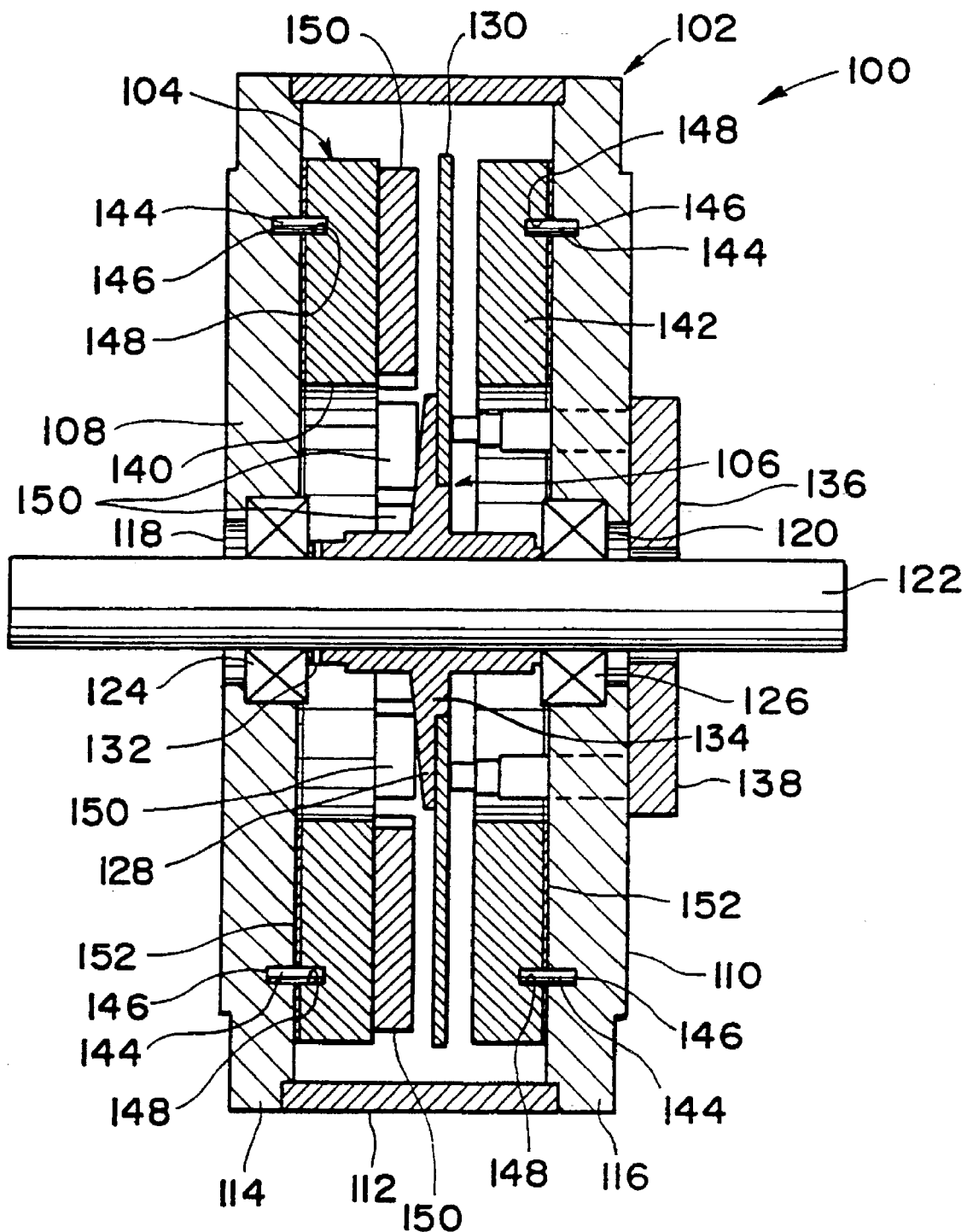
FIG. 2 is a cross sectional view of a single cage embodiment of the present invention.

Referring to FIG. 2, an axial air gap DC motor 100 in accordance with the present invention is disclosed. The motor comprises a housing 102, a stator assembly 104, and a rotor assembly 106.

The housing 102 is constructed from first and second opposed endplates 108, 110 and a cylindrical outer ring 112. The cylindrical outer ring 112 is connected between the circumferential edges 114, 116 of the endplates 108, 110 to form the cylindrical housing 102. The housing 102 is held together by bolts (not shown) passing between the first and second endplates 108, 110. The compression created by the bolts acts to maintain the endplates 108, 110 and cylindrical outer ring 112 in a predetermined configuration. Each of the endplates 108, 110 also includes a respective central opening 118, 120 adapted to accommodate a rotating shaft 122 of the rotor assembly 106 in a manner that will be discussed in more detail below.

The endplates 108, 110 are made of a lightweight, nonmagnetic, nonpermeable material. For example, the endplates are preferably made from aluminum. As such, the endplates can be manufactured by low cost casting or extrusion methods. The endplates may also be made from other low cost, nonmagnetic, nonpermeable materials, while remaining within the spirit of the present invention. For example, the endplates could be made from molded plastic. Because the endplates can be manufactured from lightweight, nonpermeable materials, they do not require expensive plating that would be required by iron or steel endplates to prevent oxidation. Although the endplates are preferably manufactured from lightweight, nonmagnetic, nonpermeable materials, they could be manufactured from steel or iron. However, doing so would diminish many of the advantages associated with the present invention.

Similarly, the cylindrical outer ring 112 is preferably manufactured from aluminum, plastic or any other lightweight, nonpermeable material that might be available for manufacturing the cylindrical housing.

The housing 102 encloses a rotor assembly 106 and a stator assembly 104. The rotor assembly 106 comprises a rotatably mounted shaft 122 secured to a pair of bearings 124, 126 respectively positioned in the central openings 118, 120 on each of the endplates 108, 110. An armature hub 128 is secured on the central portion of the rotating shaft 122 to provide a mounting structure for an armature 130. Additionally, a wave washer 132, or suitable spacer, is positioned between the armature hub 128 and a bearing 124 to maintain the armature 130 in its proper position.

The armature 130, or rotating winding, consists of an annular disc that is mounted on a ledge 134 located on the armature hub. In the preferred embodiment, the armature 130 is a stamped winding that is bonded (e.g., by epoxy) to the armature hub 128. Although the preferred embodiment utilizes stamped windings, wire windings or etched windings can be utilized in accordance with the present invention.

Electricity is supplied to the armature windings by conventional molded brush blocks 136, 138 secured to the second endplate 110. The molded brush blocks 136, 138 may be secured to the second endplate 110 by bolts or adhesive (not shown). The molded brush blocks 136, 138 reduce assembly cost, permit non-series building of the present motor, and facilitate field replacement of the brushes. Since the preferred embodiment of the present invention is intended for use with a direct current power supply, a commutator is incorporated in the stamped winding armature 130 and is contacted by the molded brush blocks 136, 138 to produce the alternating current required by such electric motors.

The stator assembly 104 comprises a first annular flux return plate 140 secured to the first endplate 108 and a second annular flux plate 142 secured to the second endplate 110. The flux return plates 140, 142 can be manufactured from steel, iron or any other acceptable magnetic, permeable material. The flux return plates 140, 142 are precisely positioned on respective endplates 108, 110 by dowels 144 extending between respective holes 146, 148 in the endplates 108, 110 and the flux return plates 140, 142. The flux return plates 140, 142 are securely held in position by four bolts (not shown) extending through each of the flux return plates 140, 142.

As shown in the embodiment of FIG. 2, a series of discrete rare earth magnets 150 (e.g., samarium cobalt or neodymium based magnets) are secured to the first flux return plate 140. The illustrative motor is an eight pole machine and therefore eight discrete magnets 150 are secured to the first flux return plate 140. The magnets 150 are evenly distributed to form an array of pole faces and are each bonded to the first flux return plate 140 by an adhesive, such as epoxy cement. The magnets 150 are magnetized to provide pole faces of alternating north and south magnetic polarities.

Although rare earth magnets are used in the preferred embodiment, any high coercivity magnets, such as ferrite, can be used in accordance with the present invention. Magnets of high coercivity can typically be made in very short lengths, as opposed to Alnico magnets that require longer lengths to produce the same magnetic field. In addition, magnets of high coercivity do not need to be magnetized in situ. They can be magnetized outside the motor without fear that they will lose their magnetization. The short length and high coercivity facilitate the ability to design a configuration where the magnets are attached to the flux return plates.

Although the preferred embodiment of the present invention utilizes annular flux return plates 140, 142 and discrete magnets 150, a wide variety of variations are possible within the spirit of the present invention. For example, the annular ring could be formed from discrete elements positioned within the housing. Additionally, an annular magnet having alternating polarized regions could be used. Decisions regarding the structure of the flux return plate and the magnets should be based upon the desired characteristics (e.g., number of poles, strength of the magnetic field, size of the motor) of the motor.

As shown in FIG. 2, shims or spacers 152 can be placed between the flux return plates 140, 142 and the endplates 108, 110 to vary the distance between the rotor assembly 106 and the stator assembly 104. This permits the performance characteristics of the present axial air gap motor 100 to be readily altered depending upon the environmental requirements of the motor. Specifically, changing the distance between the rotor assembly 106 and the stator assembly 104 permits modification of the torque and power outputs of the motor 100. Changes in the performance characteristics of the present invention are accomplished without changing the housing size, that is, the diameter or length of the motor.

Figure 3:
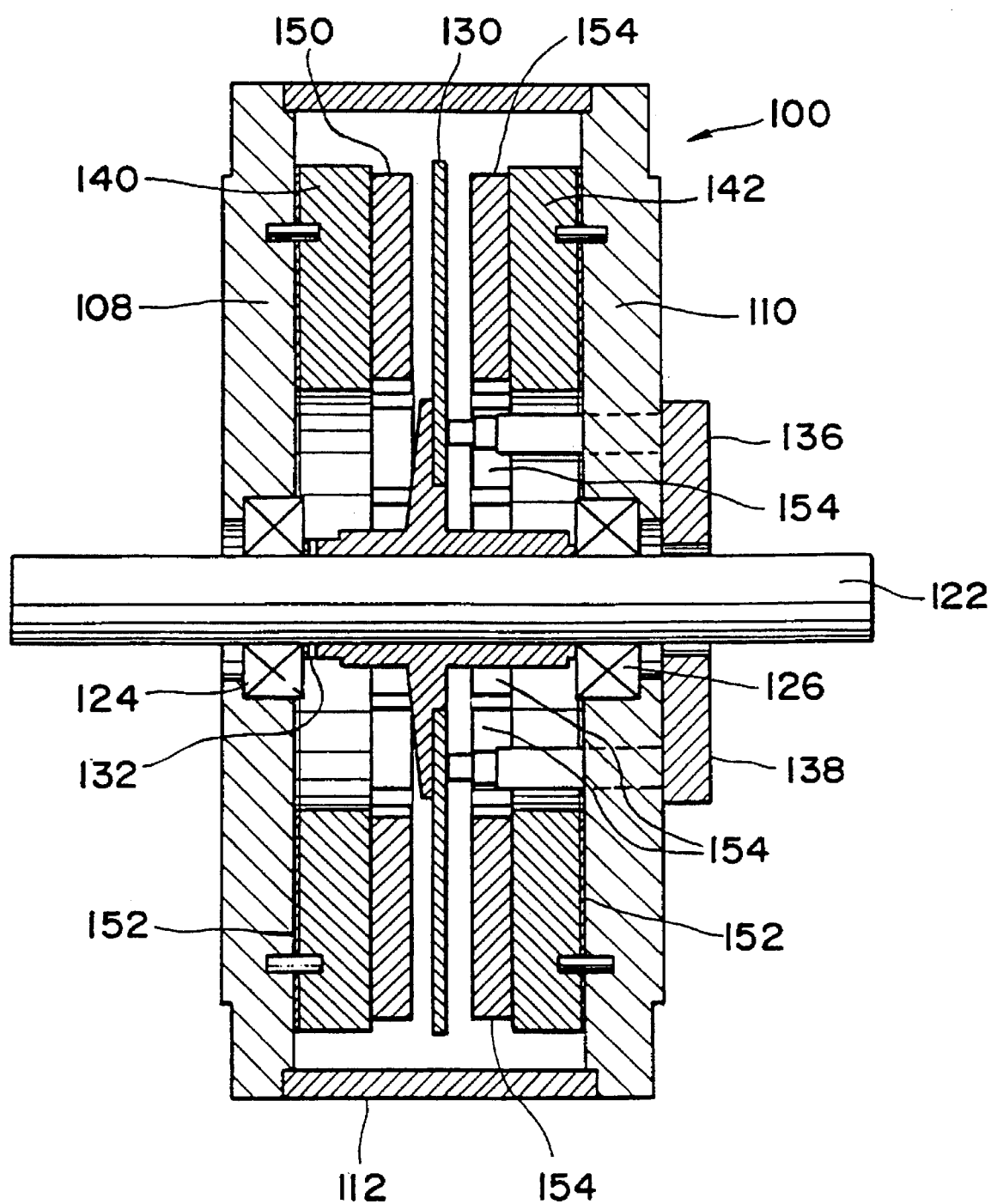
FIG. 3 is a cross sectional view of a double cage embodiment of the present invention.

FIG. 2 shows the present invention with the magnets on only one side of the rotating winding, that is, a single cage arrangement. FIG. 3 shows an alternate embodiment with the magnets on both sides of the rotating windings, that is, a double cage arrangement. Specifically, the only difference between the embodiment shown in FIG. 2 and that shown in FIG. 3 is the addition of a second series of discrete magnets 154 that are secured to the second flux return plate 142. Given the structural similarities between FIGS. 2 and 3, with the exception of the additional magnets 154 the motor of FIG. 3 is labelled using the same reference numerals as those used in FIG. 2.

In accordance with the present invention, the double cage arrangement is easily manufactured by using common parts (for example, magnets, flux plates, endplates, etc.) and assembly techniques, within a common housing size for the motor. Once again, the present invention permits variations in the motor's performance characteristics by simple alterations.

Figure 4:
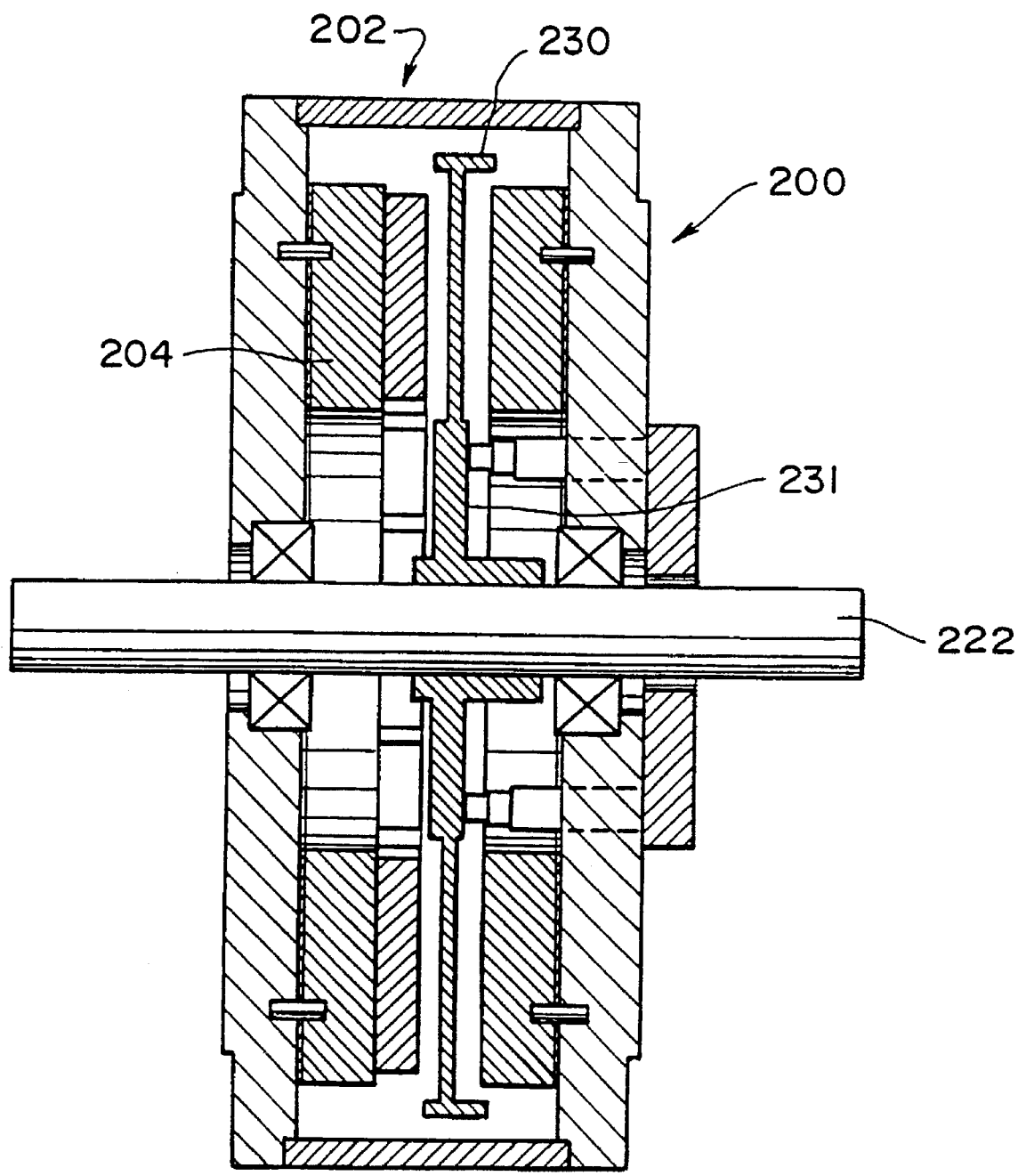
FIG. 4 is a cross sectional view of an alternate embodiment of the present invention.

As shown in FIG. 4, the motor 200 can also be made with a wire wound armature 230. The embodiment of FIG. 4 includes the same housing structure 202 and stator structure 204 as the embodiment shown in FIG. 2. However, the embodiment shown in FIG. 4 includes a wire wound armature 230 secured to the rotating shaft 222. A commutator 231 is positioned on the armature 230 to facilitate the alternating current required by the motor 200. The replacement of the stamped winding armature shown in FIGS. 2 and 3 does not effect the performance of the motor, but is merely one of many alternate embodiments that may be utilized while remaining within the spirit of the present invention.

As stated previously, the present invention advantageously permits easy assembly of axial air gap motors. Specifically, the flux return plate and the magnet can be assembled separately from the other parts, thereby compressing manufacturing cycles. Additionally, the present invention can be made either by machining, or casting, a housing from any low cost material available at the time. For example, the housing parts can be molded from plastic or extruded from aluminum. In fact, it was found that when the housing was made from extruded aluminum the motor had its greatest performance and cost advantages.

The present invention has been disclosed for use with a direct current power supply. However, the preferred embodiment could certainly be modified to work with an alternating current power supply without departing from the spirit of the present invention. Additionally, the preferred embodiment could be modified to incorporate a brushless design, while retaining the spirit of the invention.

While the preferred embodiment of the present invention has been shown and described, it will be understood that is not intended to limit the disclosure, but rather it is intended to cover all modifications and alternative methods and apparatus as falling within the sphere and scope of the invention as defined in the appended claims or there equivalents.

What is claimed is:

1. An axial air gap motor, comprising:
   a housing establishing external dimensions for the motor and having a pair of spaced apart endplates with a space therebetween;
   a stator assembly mounted within said housing;
   a rotor assembly rotatably mounted within said housing, said rotor assembly including an annular disc shaped armature located in an axial air gap;
   said stator assembly including a magnet assembly with axial dimensions secured between said endplates, a pair of flux return plates with axial dimensions which together with said magnet assembly substantially fill the axial space between said endplates to provide said air gap and for directing a magnetic field across said air gap in a direction normal to a plane of said armature, the flux return plates providing the magnetic flux return path between adjacent magnetic poles; and
   wherein said stator assembly further includes means for adjusting performance characteristics of said axial air gap motor without changing the external dimensions of said housing; and wherein said means for adjusting performance characteristics comprises shims positioned between said endplates and said flux return plates to alter said air gap.

2. The motor according to claim 1, wherein said magnet assembly includes discrete magnets of alternating polarity.

3. The motor according to claim 2, wherein said magnet assembly includes high coercivity magnets.

4. The motor according to claim 3, wherein said magnets are rare earth magnets.

5. The motor according to claim 1, wherein said flux return plates are annular.

6. The motor according to claim 1, wherein said flux return plates are made from iron.

7. The motor according to claim 1, further including brushes for transmitting electrical energy to said armature.

8. The motor according to claim 7, wherein said brushes are molded brush blocks.

9. The motor according to claim 1, wherein said endplates are nonmagnetic and nonpermeable.

10. The motor according to claim 9, wherein said endplates are made from aluminum.

11. The motor according to claim 1, wherein said armature includes stamped windings.

12. The motor according to claim 1, further including a second magnet assembly secured between said endplates such that said second magnet assembly is positioned on the opposite side of said armature from said first magnet assembly.

13. The motor according to claim 1, wherein said armature includes wire windings.

14. The motor according to claim 3, wherein said magnets are ferrite magnets.

15. The motor according to claim 1, wherein said pair flux return plates are made from steel.

16. An axial air gap motor, comprising:

a housing establishing external dimensions for the motor and having a pair of spaced apart endplates with a space therebetween;

a stator assembly mounted within said housing;

a rotor assembly rotatably mounted within said housing, said rotor assembly including an annular disc shaped armature located in an axial air gap;

said stator assembly including a magnet assembly with axial dimensions secured between said endplates, a pair of flux return plates with axial dimensions which together with said magnet assembly substantially fill the axial space between said endplates to provide said air gap and for directing a magnetic field across said air gap in a direction normal to a plane of said armature the flux return plates providing the magnetic flux return path between adjacent magnetic poles;

said stator assembly further including means for adjusting performance characteristics of said axial air gap motor without changing the dimensions of said housing; and wherein said means for adjusting performance characteristics without changing the dimensions of said housing comprises altering the relative axial dimension of the flux return plates relative to the magnet assemblies; and said means for adjusting performance characteristics comprises shims positioned between said end plates and said flux return plates.

17. An axial air gap DC motor, comprising:

a housing having a pair of spaced apart nonmagnetic nonpermeable endplates;

a stator assembly mounted within said housing;

a rotor assembly rotatable mounted within said housing, said rotor assembly including an annular disc shaped armature located within an air gap;

a molded brush block mounted on said housing for transmitting electrical energy to said armature;

said stator assembly including a pair of magnetic, permeable annular flux return plates secured between said endplates and a series of discrete magnets of alternating polarities secured between said flux return plates, said series of discrete magnets being positioned for directing a magnetic field to said armature in a direction normal to a plane of said armature and wherein said stator assembly further includes means for adjusting performance characteristics of said axial air gap motor; and said means for adjusting performance characteristics comprises shims positioned between said end plates and said flux return plates to alter said air gap.

18. The motor according to claim 17, further comprising a second series of discrete magnets of alternating polarities secured between said flux return plates.

19. The motor according to claim 17, wherein said armature includes wire windings.

20. The motor according to claim 17, wherein said armature includes stamped windings.

21. An axial air gap motor, comprising:

a housing establishing external dimensions for the motor and having a pair of spaced apart endplates with a space therebetween;

a stator assembly mounted within said housing;

a rotor assembly rotatably mounted within said housing, said rotor assembly including an annular disc shaped armature located in an axial air gap;

said stator assembly including a magnet assembly with axial dimensions secured between said endplates, a pair of flux return plates with axial dimensions which together with said magnet assembly substantially fill the axial space between said endplates to provide said air gap and for directing a magnetic field across said air gap in a direction normal to a plane of said armature, the flux return plate providing the magnetic flux return path between adjacent magnetic poles;

said stator assembly further including means for adjusting performance characteristics of said axial air gap motor without changing the dimensions of said housing; and wherein said means for adjusting performance characteristics comprises shims positioned between said endplates and said flux return plates to alter said air gap.

* * * * *